United States Patent
Bremer et al.

(10) Patent No.: US 11,531,656 B1
(45) Date of Patent: Dec. 20, 2022

(54) DUPLICATE DETERMINATION IN A GRAPH

(71) Applicant: International Business Machines Corporation, Armonk, NY (US)

(72) Inventors: Lars Bremer, Boeblingen (DE); Thuany Karoline Stuart, Nice (FR); Hemanth Kumar Babu, Boeblingen (DE); Martin Oberhofer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/341,430

(22) Filed: Jun. 8, 2021

(51) Int. Cl.
*G06F 16/215* (2019.01)
*G06F 16/901* (2019.01)

(52) U.S. Cl.
CPC ........ *G06F 16/215* (2019.01); *G06F 16/9024* (2019.01)

(58) Field of Classification Search
None
See application file for complete search history.

(56) References Cited

U.S. PATENT DOCUMENTS

| 7,062,493 | B1 * | 6/2006 | Babka | G06F 16/9027 707/999.005 |
| 10,642,891 | B2 | 5/2020 | Choe | |
| 2009/0262664 | A1 * | 10/2009 | Leighton | G06F 16/9024 370/254 |
| 2010/0063973 | A1 * | 3/2010 | Cao | G06F 16/2455 707/758 |
| 2013/0257874 | A1 | 10/2013 | Saund | |
| 2014/0075004 | A1 | 3/2014 | Van Dusen | |
| 2014/0149465 | A1 | 5/2014 | Kannan | |

(Continued)

FOREIGN PATENT DOCUMENTS

| CN | 107133257 A | 9/2017 |
| CN | 108985588 A | 12/2018 |

(Continued)

OTHER PUBLICATIONS

Gross, Geoff. Graph Analytic Techniques in Uncertain Environments: Graph Matching and Link Analysis. Doctoral dissertation, University at Buffalo, State University of New York. Published May 7, 2013. ProQuest Dissertations Publishing. (Year: 2013).*

(Continued)

*Primary Examiner* — Tony Mahmoudi
*Assistant Examiner* — Umar Mian
(74) *Attorney, Agent, or Firm* — Brian M. Restauro

(57) ABSTRACT

Embodiments of the present invention provide for a method for duplicate determination in a graph. The graph comprises nodes representing entities and edges representing relationships between the entities. Embodiments of the present invention identify two target nodes in the graph. A neighborhood subgraph may be determined for each of the two nodes. The neighborhood subgraph includes the respective node. Embodiments of the present invention can then determine whether the two nodes are duplicates with respect to each other, based on a result of a comparison between the two subgraphs and based on a comparison of the two target nodes of the subgraphs.

17 Claims, 6 Drawing Sheets

(56) References Cited

U.S. PATENT DOCUMENTS

| | | |
|---|---|---|
| 2014/0280224 A1 | 9/2014 | Feinberg |
| 2015/0012509 A1 | 1/2015 | Kirn |
| 2015/0039611 A1 | 2/2015 | Deshpande |
| 2015/0088841 A1 | 3/2015 | Fuglsang |
| 2017/0262868 A1 | 9/2017 | Manjunath |
| 2017/0316175 A1 | 11/2017 | Hu |
| 2017/0337268 A1 | 11/2017 | Ait-Mokhtar |
| 2018/0075359 A1 | 3/2018 | Brennan |
| 2018/0189564 A1 | 7/2018 | Freitag |
| 2018/0373932 A1 | 12/2018 | Albrecht |
| 2019/0205479 A1 | 7/2019 | Zizka |
| 2019/0228224 A1 | 7/2019 | Guo |
| 2020/0257731 A1 | 8/2020 | Srinivas |

FOREIGN PATENT DOCUMENTS

| | | |
|---|---|---|
| WO | 2017213537 A1 | 12/2017 |
| WO | 2019220128 A1 | 11/2019 |

OTHER PUBLICATIONS

Dasan, Sakhti. "Distance Measures—What is Similarity, Dissimilarity and Correlation." Published Aug. 26, 2014. Retrieved Mar. 24, 2022 from https://blog.shakthydoss.com/2014/08/distance-measures-what-is-similarity.html (Year: 2014).*

Chen, Alan Chia-Lung, et al. "Approximating the maximum common subgraph isomorphism problem with a weighted graph." Knowledge-Based Systems 85 (2015): 265-276. (Year: 2015).*

"Match comparisons", IBM Documentation, Release date: Dec. 14, 2012, 5 pages, <https://www.ibm.com/support/knowledgecenter/SSZJPZ_9.1.0/com.ibm.swg.im.iis.ds.design.help.doc/topics/c_qresfgde_Match_comparisons.html>.

"Probabilistic vs. deterministic matching styles", IBM Documentation, Last updated: Mar. 24, 2021, 3 pages, <https://www.ibm.com/docs/en/imdm/11.6?topic=data-probabilistic-vs-deterministic-matching-styles>.

Bleiholder et al., "Data Fusion", ACM Computing Surveys, vol. 41, No. 1, Article 1, Publication date: Dec. 2008, 41 pages, <http://doi.acm.org/10.1145/1456650.1456651>.

Chawla et al., "SMOTE: Synthetic Minority Over-sampling Technique", Journal of Artificial Intelligence Research 16 (2002) 321-357, Submitted Sep. 2001; published Jun. 2002, 37 pages.

Christen, Peter, "A Survey of Indexing Techniques for Scalable Record Linkage and Deduplication", IEEE Transactions on Knowledge and Data Engineering, 2011, 20 pages.

Krleza et al., "Graph Matching using Hierarchical Fuzzy Graph Neural Networks", IEEE Transactions on Fuzzy Systems, vol. X, No. Y, Aug. 2016, 13 pages.

Oberhofer et al., "Method for Weighting a Graph", Application No. EP20171979.6, Filed Apr. 29, 2020, 21 pages.

Stuart et al., "Method for Duplicate Determination in a Graph", Application No. EP20171981.2, Filed Apr. 29, 2020, 29 pages.

Oberhofer et al., "Method for Weighting a Graph", U.S. Appl. No. 17/234,835, filed Apr. 20, 2021, 22 pages.

Stuart et al., "Method for Duplicate Determination in a Graph", U.S. Appl. No. 17/114,547, filed Dec. 8, 2020, 33 pages.

Appendix P—List of IBM Patents or Patent Applications Treated as Related, Filed herewith, 2 Pages.

* cited by examiner

DUPLICATE DETERMINATION IN A GRAPH

BACKGROUND

The present invention relates to the field of digital computer systems, and more specifically, to a method for duplicate determination in a graph.

A database system may, for example, use graph structures for semantic queries with nodes, edges, and properties to represent and store data. The graph relates the data items in the store to a collection of nodes and edges, the edges representing the relationships between the nodes. The relationships allow data in the store to be linked together directly and, in many cases, retrieved with one operation.

SUMMARY

Various embodiments provide a method for duplicate determination in a graph, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented for duplicate determination in a graph, the graph comprising nodes representing entities and edges representing relationships between the entities. The method comprises: identifying (named first identifying step) at least two target nodes in the graph; determining (named first determining step) a neighborhood subgraph for each of the two target nodes, the neighborhood subgraph including the respective target node; comparing (named first comparing step) the two neighborhood subgraphs; comparing (named second comparing step) the two target nodes; and determining (named second determining step) whether the two target nodes are duplicates with respect to each other, based on the comparison of the two neighborhood subgraphs and on the comparison of the target nodes.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for duplicate determination in a graph, the graph comprising nodes representing entities and edges representing relationships between entities. The computer system is configured for: identifying at least two target nodes in the graph; determining a neighborhood subgraph for each of the two target nodes, the neighborhood subgraph including the respective target node; comparing the two neighborhood subgraphs; comparing the two target nodes; and determining whether the two target nodes are duplicates with respect to each other, based on the comparison of the two neighborhood subgraphs and on the comparison of the target nodes.

BRIEF DESCRIPTION OF THE DRAWINGS

In the following embodiments of the invention are explained in greater detail, by way of example only, making reference to the drawings in which.

DETAILED DESCRIPTION

Figure 1A:
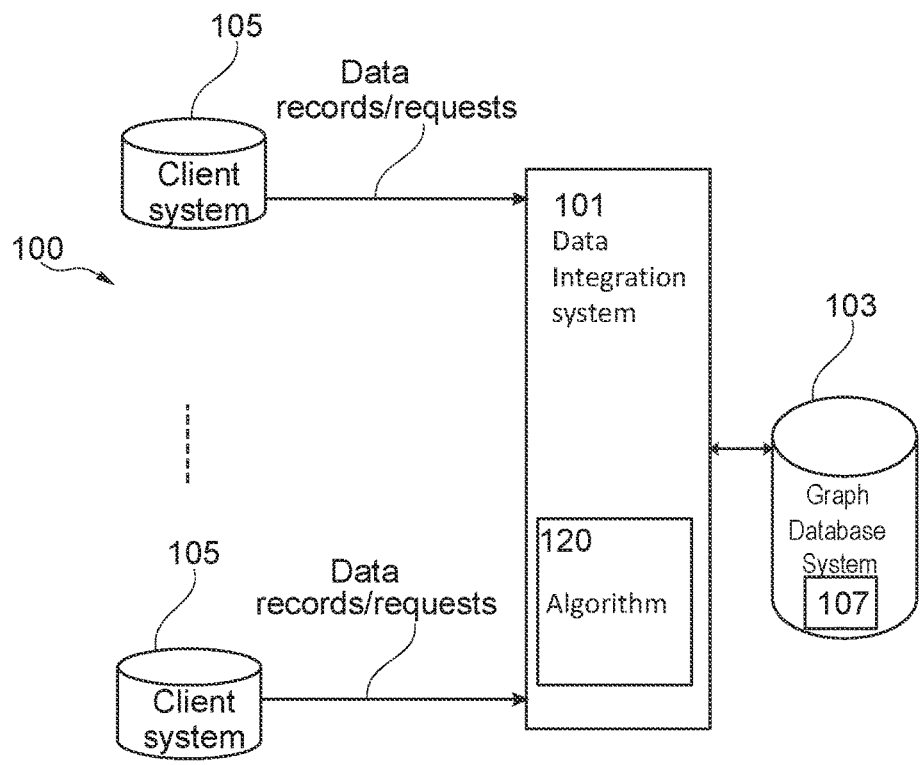
FIG. 1A is a diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

"First," "Second," etc. as used herein, these terms are used as labels for nouns that they precede, and do not imply any type of ordering (e.g., spatial, temporal, logical) unless explicitly defined as such.

A graph refers to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v (starting node) toward node v2. A node of the graph may represent an entity. The entity refers to a user, object etc. The entity may have certain entity attributes or properties which may be assigned values. For example, a person may be an entity. The entity attributes of the person may, for example, comprise a marital status, age, gender etc. The edge may be assigned edge attribute values indicative of at least a relationship between the two nodes connected to the edge. The relationship may, for example, comprise an inheritance (e.g. parent and child) relationship and/or associative relationship in accordance with a certain hierarchy. For example, the inheritance relationship between nodes v and v2 may be referred to as a "is-a relationship" between v and v2 e.g. "v2 is-a parent of v1". The associative relationship between nodes v and v2 may be referred to as a "has-a relationship" between v1 and v2 e.g. "v2 has a has-a relationship with v1" means that v1 is part or is a composition of or associated with v2.

The graph may represent entities and relationships of a set of one or more domains. A domain (also referred to as domain ontology) represents concepts or categories which belong to a part of the world, such as biology or politics. The domain typically models domain-specific definitions of terms. For example, a domain can refer to a healthcare, advertising, commerce, medical and/or biomedical-specific field. The set of one or more domains may represent an ontology. For example, the set of domains may comprise a family domain and company domain, wherein the family domain and company domain belong to a same ontology which may be an employee ontology.

Processing the graphs may however technically be challenging because the graphs have usually millions of nodes and edges such as a graph that stores data of millions of customer records, contracts, etc. as well as person records related to companies with hundreds of thousands of employees. This may be particularly challenging in case of data deduplication. For example, a master data management (MDM) system uses graphs as persistency storage to identify duplicate records and may need to resolve them if applicable. This process is a matching process and uses deterministic and/or probabilistic matching techniques with fuzzy operators such as phonetics (Soundex, NYSIIS, . . . ), edit distance, nick name resolution, etc. The present subject matter may improve the performance of this kind of processes. For that, the matching in accordance with the present subject matter may combine different scores that result from independent comparisons of nodes of surrounding subgraphs. This may enable to identify entities as duplicates if their relationship network to neighboring entities shows a high degree of similarity. In graph terms, if two records represented as nodes in the graph have a high degree of local subgraph similarity and high degree of similarity between them, they may be considered as duplicates. As a result, very important insights of whether or not two records should be merged is factored into the decision making process producing optimal results. The present subject matter may thus improve the accuracy of deduplication processes. The following embodiments enable further improvement of the accuracy of deduplication processes.

According to one embodiment, the first comparing step of the two neighborhood subgraphs results in a first score indicative of a difference between the two neighborhood subgraphs. The second comparison of the target nodes results in a second score indicative of a similarity between the target nodes. The method further comprises: identifying (named second identifying step) at least one pair of candidate nodes, such that one node of each pair is in one neighborhood subgraph and the other node of the pair is in the other neighborhood subgraph, the candidate nodes being different from the target nodes, comparing (named third comparing step) the at least one pair of candidate nodes resulting in at least one third score that is indicative of a similarity between the at least one pair of candidate nodes respectively, reducing the first score based on the at least one third score, and combining the reduced first score and the second score for the determining whether the two target nodes are duplicates with respect to each other based on the combined score.

According to one embodiment, the first comparing step comprises: performing a mapping between the two neighborhood subgraphs, identifying first pairs of corresponding nodes which do not fully map with each other, identifying second pairs of corresponding nodes which fully map with each other, assigning to each pair of the second pairs a second initial node score indicating that there is no difference between the pair of nodes, assigning to each pair of the first pairs a first initial node score indicating that the pair of nodes are completely different, combining the first and second initial node scores for determining a first score indicative of the comparison result of the two subgraphs.

According to one embodiment, the first comparing step comprises: performing a mapping between the two neighborhood subgraphs, identifying first pairs of corresponding nodes which do not fully map with each other, wherein the at least one identified pair of candidate nodes is selected from the first pairs, identifying second pairs of corresponding nodes which fully map with each other, assigning to each pair of the second pairs a second initial node score indicating that there is no difference between the pair of nodes, assigning to each pair of the first pairs a first initial node score indicating that the pair of nodes are completely different, wherein the reducing of the first score comprises: changing the first initial node score assigned to each pair of the at least one identified pair of candidate nodes to indicate a reduced difference level between the pair of nodes based on the respective third score; and combining the second initial node scores and the non-changed first initial node scores and the changed first initial node scores. The non-changed first initial node scores may be the first initial node scores which are not changed.

According to one embodiment, the second and the third comparison steps are performed using a probabilistic matching method.

According to one embodiment, the entity has a set of entity attributes, wherein each of the second comparing step and the third comparing step comprises: comparing values the set of entity attributes of the two compared nodes and determining for each attribute of the set of attributes an attribute score indicative of a comparison result of the values of the attribute and combining the attribute scores for determining the first score or third score.

According to one embodiment, the first identifying step further comprises determining a probability whether the two target nodes represent the same entity and in response to determining that the probability is smaller than a threshold performing the first determining, the comparing steps, the second identifying and the second determining.

According to one embodiment, the determining of the neighborhood subgraph of the node comprises: selecting nodes of the graph using a selection criterion. The selection criterion is based on at least one of: a number of nodes, an entity represented by a node, wherein the subgraph comprises the selected nodes. This may enable an automatic and thus efficient duplicate determination in accordance with the present subject matter.

According to one embodiment, the selection criterion requires at least one of: the number of nodes of the subgraph being smaller than a maximum number; and the edge of the subgraph connected to at least one node that represents a same entity as the entity of the node. For example, the computer system may be provided with configurable parameters associated with these criteria. The configurable parameters may dynamically be adapted depending on the use cases.

According to one embodiment, the determining of the neighborhood subgraphs comprises removing duplicate nodes of each subgraph of the neighborhood subgraphs.

According to one embodiment, the method further comprises using a received indication of the two identified nodes for the identifying. For example, a user may provide an input or a request. The received request or input comprises information about the at least two nodes. This information may be used to identify the at least two nodes in the graph.

FIG. 1A depicts an exemplary computer system 100. The computer system 100 may, for example, be configured to perform master data management and/or data warehousing e.g., the computer system 100 may enable a de-duplication system. The computer system 100 comprises a data integration system 101 and one or more client systems 105 or data sources. The client system 105 may comprise a computer system (e.g., as described with reference to FIG. 6). The data integration system 101 may control access (read and write accesses etc.) to a graph database system 103.

The client systems 105 may communicate with the data integration system 101 via a network connection which comprises, for example, a wireless local area network (WLAN) connection, WAN (Wide Area Network) connection LAN (Local Area Network) connection or a combination thereof.

The client system 105 may be configured to receive or generate a query request. For example, the client system 105 generates or receives a query request at the graph database system 103. The query request may, for example, request the identification of duplicate nodes. The client system 105 sends or forwards the query request to the data integration system 101. The data integration system 101 may be configured to fetch data using the graph database system 103 to compute the appropriate subsets of a graph 107 of the graph database system 103 to be sent back to the client system 105 in response to the query request.

In another example, each client system 105 may be configured to send data records to the data integration system 101 in order to be stored by the graph database system 103. A data record or record may be a collection of related data items such as a name, date of birth and class of a particular entity. A record represents an entity, wherein an entity refers to a user, object, or concept about which information is stored in the record. The terms "data record" and "record" are interchangeably used. The graph database system 103 may use the graph 107 in order to store the records as entities with relationships, where each record may be assigned to a node or vertex of the graph 107 with properties being attribute values such as name, date of birth etc. The data integration system 101 may store the records received from client systems 105 using the graph database system 103 and checks for duplicate nodes in the graph 107. For example, the client systems 105 may be configured to provide or create data records which may or may not have the same structure as the graph 107. For example, a client system 105 may be configured to provide records in XML or JSON format or other formats that enable to associate attributes and corresponding attribute values.

In one example, the data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

The data integration system 101 may be configured to process the received records using one or more algorithms such as an algorithm 120 implementing at least part of the present method. For example, the data integration system 101 may process data records of the graph 107 using the algorithm 120 in order to find pairs of records that represent the same entity or duplicate records in accordance with the present disclosure. Although shown as separate components, the graph database system 103 may be part of the data integration system 101 in another example.

Figure 1B:
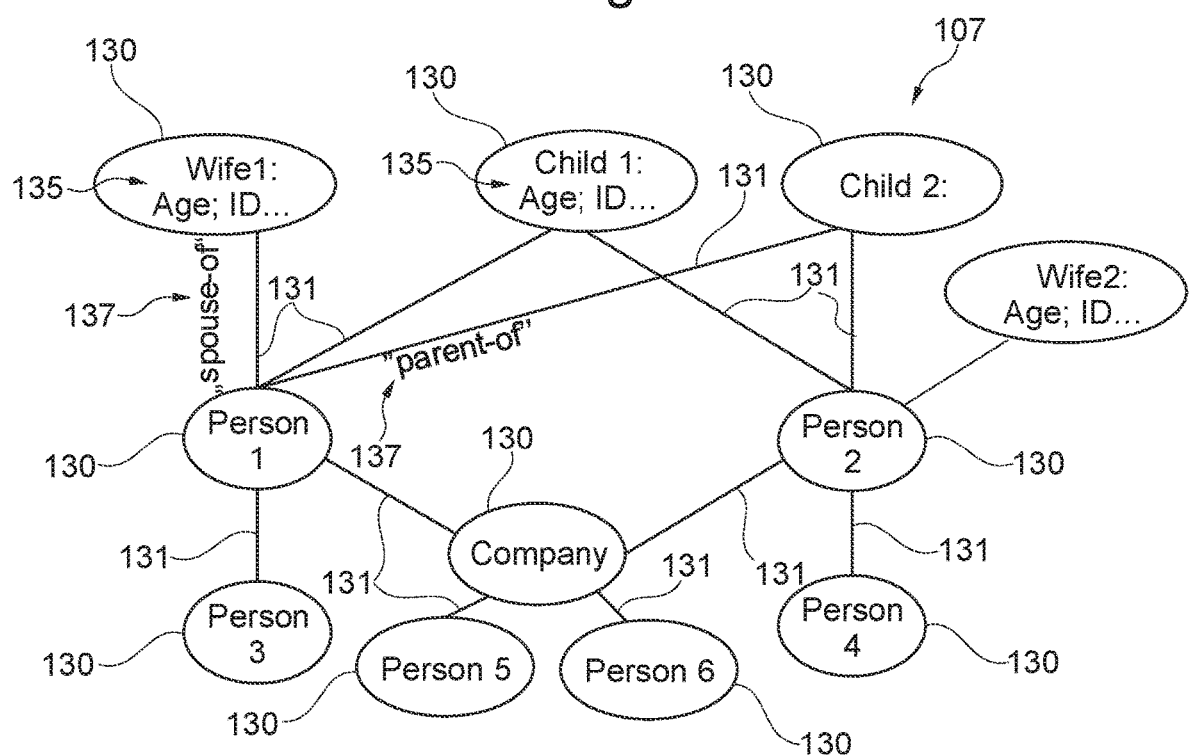
FIG. 1B is a diagram of a simplified structure of a graph in accordance with an example of the present subject matter.

FIG. 1B is a diagram of a simplified structure of the graph 107 in accordance with an example domain ontology. The example ontology concerns employees of a company. The graph 107 has a plurality of nodes 130 which represent employees of the company. Each of the nodes 130 may comprise attribute values of entity attributes of a respective record. For example, a node 130 representing a wife has attribute values of entity attributes 135 such as age, ID etc. The nodes 130 are linked together by a plurality of edges 131. The edge 131 is associated with edge attribute values 137 indicative of the relations between respective nodes. For example, the edge 131 linking the node persone1 and the node wife1 is associated with an edge attribute value "spouse-of" indicating that the person represented by the node person1 is a spouse of the person represented by the node wife1. By traversing the graph 107, the data integration system 101 can find out which respective nodes are related to other nodes.

The graphs are represented in the present drawings as follows. The nodes of a graph are represented by circles/ellipses in the drawings and the edges are represented by lines connecting two nodes of the graph. Entities such as wife1, Person1 etc. which are represented by the nodes are written inside the circles. For simplification of the drawings and the description, only part of the nodes and edges are shown with part of their associated entity and edge attributes. However, each node and each edge of a graph may be associated with one or more entity attributes and one or more edge attributes respectively.

Figure 2:
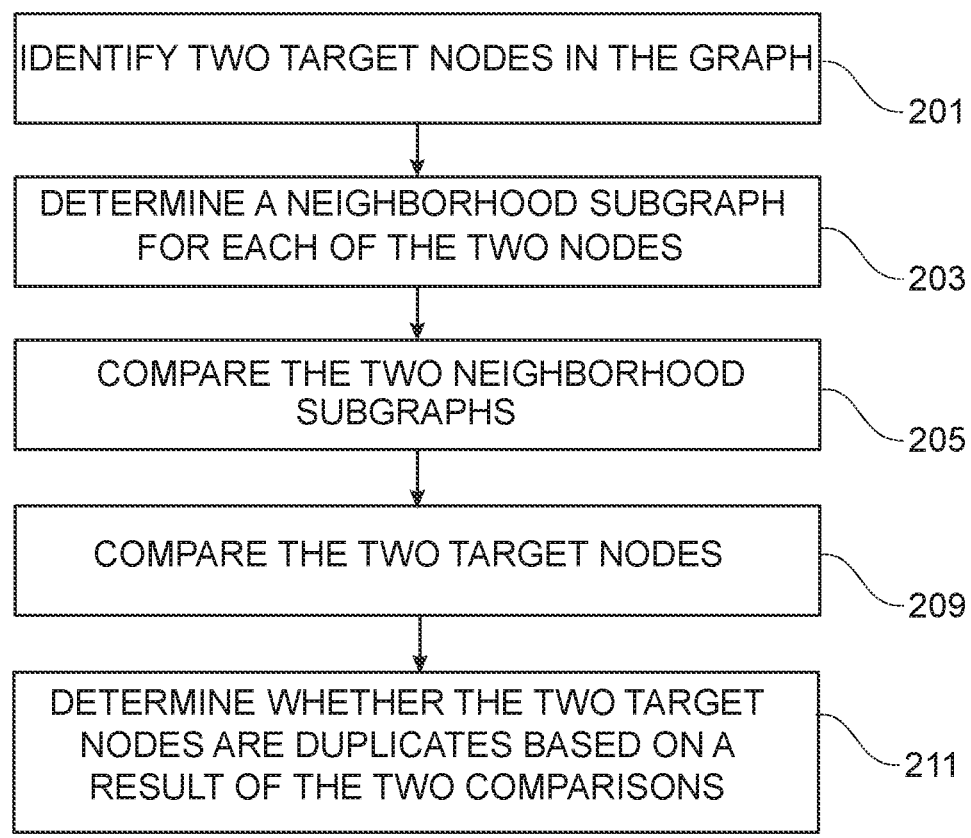
FIG. 2 is a flowchart of a method for duplicate determination in a graph in accordance with an example of the present subject matter.

FIG. 2 is a flowchart of a method for duplicate determination in a graph e.g., 107, in accordance with an example of the present subject matter. For the purpose of explanation, the method may be implemented in the computer system 100 illustrated in previous FIGS. 1A-B, but is not limited to this implementation. The method may for example be performed by the data integration system 101.

At least two nodes may be identified or determined in the graph 107 in step 201. The identified nodes may be target nodes that may need to be determined whether they represent the same entity i.e., whether they are duplicate nodes. In one example, two nodes may be identified in step 201. In another example, more than two nodes may be identified in step 201. Identifying the nodes in step 201 may, for example, be performed automatically e.g., the two nodes may randomly be selected from the graph 107. This may be advantageous in case of a need to deduplicate the whole graph. In another example, the identifying of the nodes may be performed using an information or request received from a user. The received information or request may indicate nodes. Those indicated nodes may be identified in step 201. In another example, the identifying of the nodes in step 201 may be performed in response to inserting or adding a new node in the graph 107, wherein the inserted node is part of the identified nodes. This may enable a controlled data storage in the graph 107.

For simplification of the description, the number of the identified nodes in step 201 may be two target nodes named node1 and tnode2 but it is not limited to.

For each node of the two target nodes node1 and tnode2, a neighborhood subgraph of the graph 107 may be determined in step 203. This may result in a neighborhood subgraph that comprises the target node tnode1 and another neighborhood subgraph that comprises the target tnode2. The neighborhood subgraph of tnode1 in the graph 107 may be the subgraph of the graph 107 induced by neighboring nodes to tnode1 e.g., the subgraph composed of the nodes adjacent to tnode1 and all edges connecting nodes adjacent to tnode1. An adjacent node of node tnode1 in the graph 107 is a node that is connected to tnode1 by an edge. Following the example of FIG. 1B, the two subgraphs 307A and 307B of FIG. 3 may be provided in step 203.

In one example, a user may be prompted to determine the neighborhood subgraphs by presenting on a display, the graph 107 and the two identified nodes e.g., a zoom of the graph 107 around the two identified nodes may be displayed. The user may provide an input indicative of the two neighborhood subgraphs.

In one example, the neighborhood subgraphs may automatically be determined using one or more selection criteria or conditions. For example, the subgraph of tnode1 should fulfill a first condition according to which each edge of the subgraph is connected to at least one node that represents a same entity type as the entity of the node tnode1. The at least one node may, for example, be the starting node of the edge. That is, the first condition may require that each edge of the graph has a starting node that represents a same entity type as the entity of the node tnode1. This may enable to obtain a subgraph that represents a same domain and thus may enable an efficient subgraph mapping. However, the size of the resulting subgraph may be large e.g., the number of nodes in the subgraph is higher than a threshold. In this case, the first condition may be supplemented with a second condition according to which the maximum distance between tnode1 and any node in the subgraph may be N edges where e.g., N>=2. The distance between two nodes in a graph may be the number of edges in a shortest path connecting them. For example, in case the adjacent node adj1 of the node tnode1 represents the same entity type as tnode1 and N=2, then an adjacent node adj3 of the adjacent node adj1 and their connecting edge (i.e., between adj1 and adj3) may be added to the subgraph. In other words, a path from the node tnode1 via node adj1 may include at most tnode1 and adj1 and adj3 in case adj1 represents the same entity type as node1. Or a path from the node tnode1 may include at most tnode1 and adj1 in case node adj1 represents an entity type different from the entity type represented by tnode1. For example, if tnode1 represents a person and the adjacent node adj1 represents a company, then a path from tnode1 includes adj1 at most. In another example, if tnode1 represents a person and the adjacent node adj1 represents also a person, then a path from tnode1 can include adj1 and one other node adjacent to adj1 if N=2. The determination of the subgraph of tnode2 is similar to the described determination of the subgraph of tnode1. Hence, the selection criteria enable a controlled and efficient selection of the subgraphs and thus an optimal mapping of the subgraphs. The determined subgraphs may further be improved by using one or more predefined filtering rules. For example, a first filtering rule may require that edges of predefined types may be filtered out of the determined subgraphs. A second filtering rule may require that a node representing a predefined entity may be filtered out or assigned a low weight that should be considered during the subgraph mapping. The filtering rules may optionally be applied on the determined subgraphs. Another example for determining the subgraphs may include a machine learning classifier that determines how to build the subgraphs. The classifier may be trained based on stewards' feedback.

Figure 4:
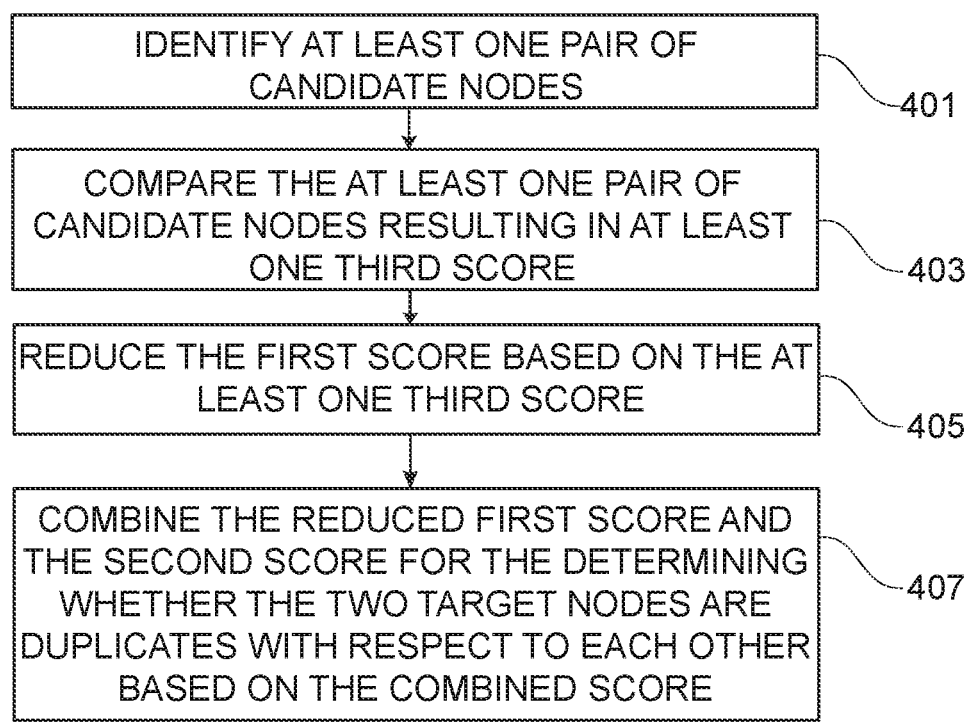
FIG. 4 is a flowchart of a method for determining a first score in accordance with an example of the present subject matter.
Figure 5:
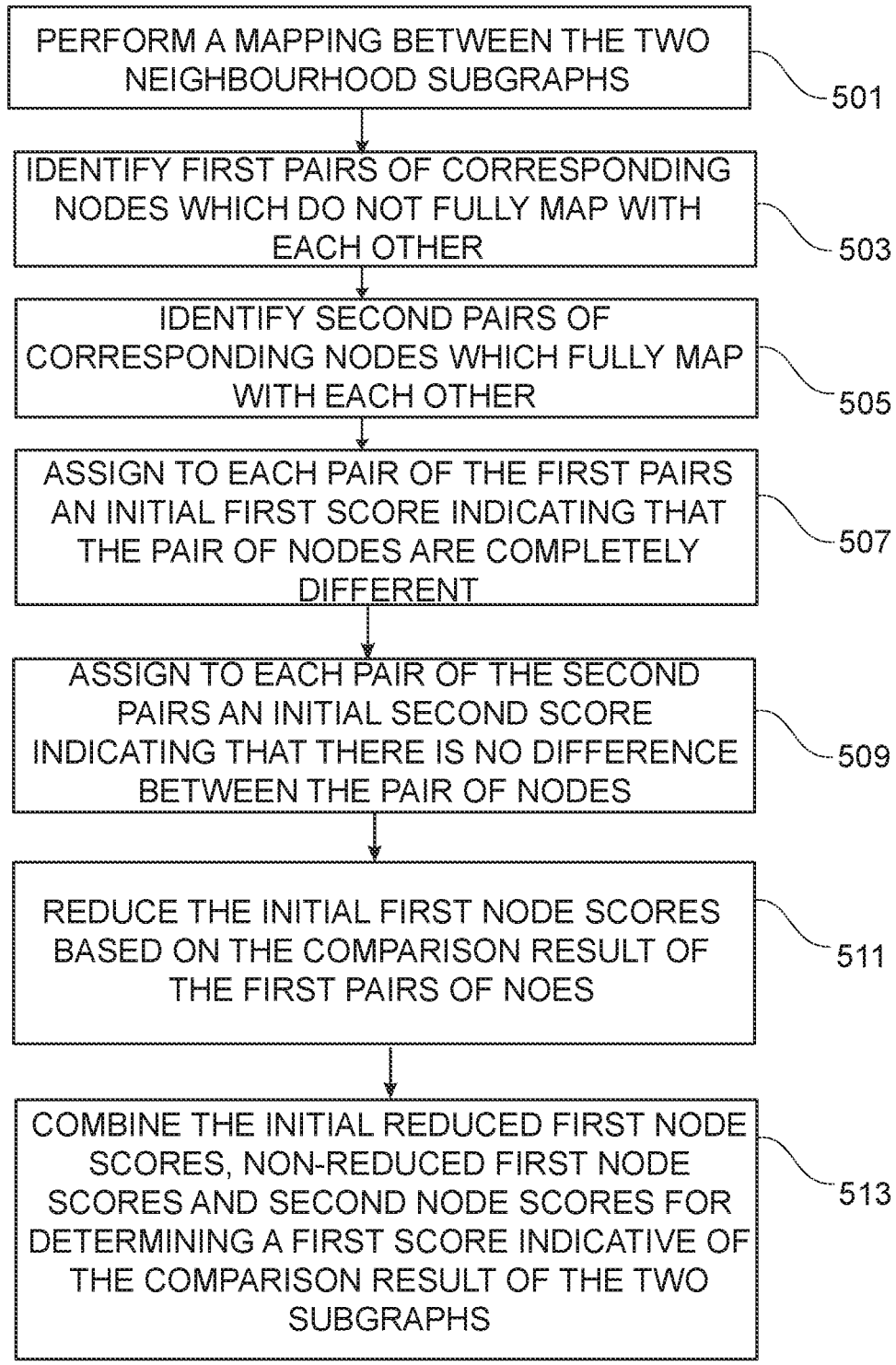
FIG. 5 is a flowchart of a method for determining a first score in accordance with an example of the present subject matter.

The determined subgraphs may be compared to each other in step 205. This may be referred to as first comparison step. For example, a first score $S_{GRP}$ may be determined based on the comparison result between the two subgraphs. The first score $S_{GRP}$ may be a probability indicating how likely the two subgraphs are not the same. Assuming, for example, that the two subgraphs comprise J corresponding pairs of nodes, wherein the J corresponding pairs of nodes excludes the pair of identified target nodes tnode1 and tnode2. For example, the comparison of the two subgraphs may be performed between the J corresponding pairs of nodes. Each pair of the j corresponding pairs of nodes may be fully mapped to each other or not fully mapped to each other. For example, $J_1$ pairs of nodes may be fully mapped and remaining $J_2$ pairs of nodes may not be fully mapped. Each pair of the $J_1$ corresponding pairs of nodes may be assigned an initial node score of zero as they are fully mapped and each pair of the $J_2$ corresponding pairs of nodes may be assigned an initial node score of 1 as they are not fully mapped. Those initial node scores may be summed to obtain the first score $S_{GRP}$ e.g., $S_{GRP}=J_1 \times 0 + J_2 \times 1 = J_2$. FIGS. 4 and 5 provide an example determination of the first score $S_{GRP}$.

The two target nodes tnode1 and tnode2 may be compared with each other in step 209. This may be referred to as second comparison step. The result of the comparison of the two target nodes tnode1 and tnode2 may confirm or further indicate whether the two target nodes tnode1 and tnode2 are duplicates. The second comparison may for example be performed by individually comparing values the set of entity attributes of the two target nodes and determining for each attribute $ATT_i$ (i=1, . . . n, n being the number of attributes) of the set of attributes an attribute score $S^i_{att}$ indicative of a comparison result of the values of the attribute $ATT_i$. The attribute scores $S^i_{att}$ may be combined for determining a second score $S_{TNODE}$ which is indicative of the similarity between the two target nodes based on the second comparison. The combination of the attribute scores may for example be the sum of the attribute scores, $S_{TNODE} = \Sigma^n_{i=1} S^i_{att}$. In another example, the combination of the attribute scores may be the weighted sum of the attribute scores using weights $w_i$ assigned to the entity attributes, $S_{TNODE} = \Sigma^n_{i=1} w_i \times S^i_{att}$ e.g., if two persons are compared, the last name may have a higher weight compared to the address attribute etc.

It may be determined, in step 211, whether the two target nodes tnode1 and tnode2 are duplicates with respect to each other based on a result of the comparison performed in step 205 and the comparison performed in step 209. For example, if the first score $S_{GRP}$ is smaller (i.e., lower) than a first threshold, and the second score $S_{TNODE}$ is higher than a second threshold then the target nodes may be duplicate nodes. In another example, the second score may be combined with the inverse of the first score (e.g., $S_{TNODE}+1/S_{GRP}$) in order to obtain one combined score and if that combined score is higher than a threshold then the target nodes may be duplicate nodes.

In case it is determined that the two nodes tnode1 and tnode2 are duplicate nodes, the two nodes tnode1 and tnode2 may be merged and a correct edge embedding may be reestablished in the graph 107.

Figure 3:
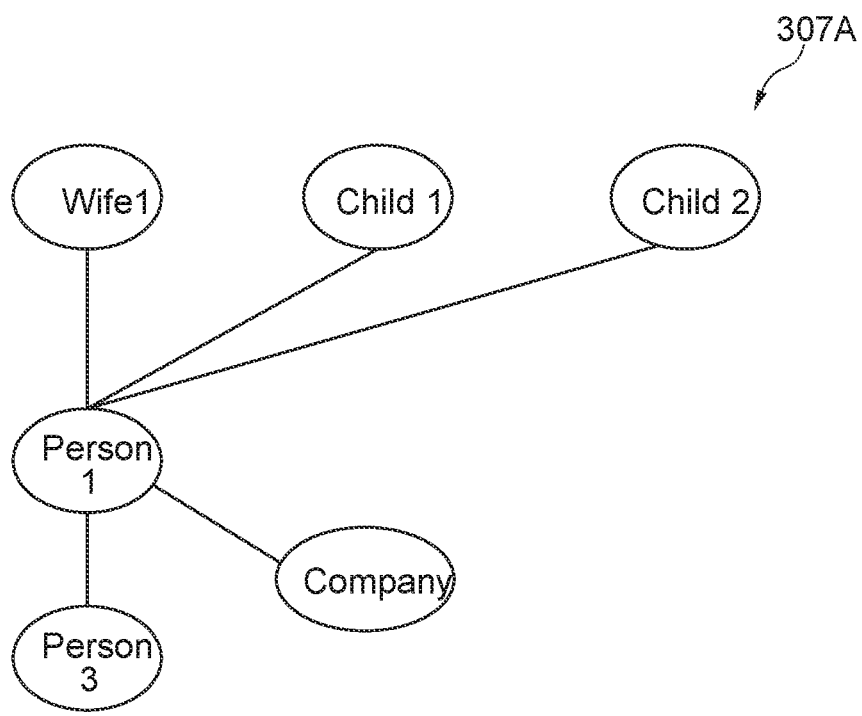
FIG. 3 shows two subgraphs determined in accordance with an example of the present subject matter.
Figure 3:
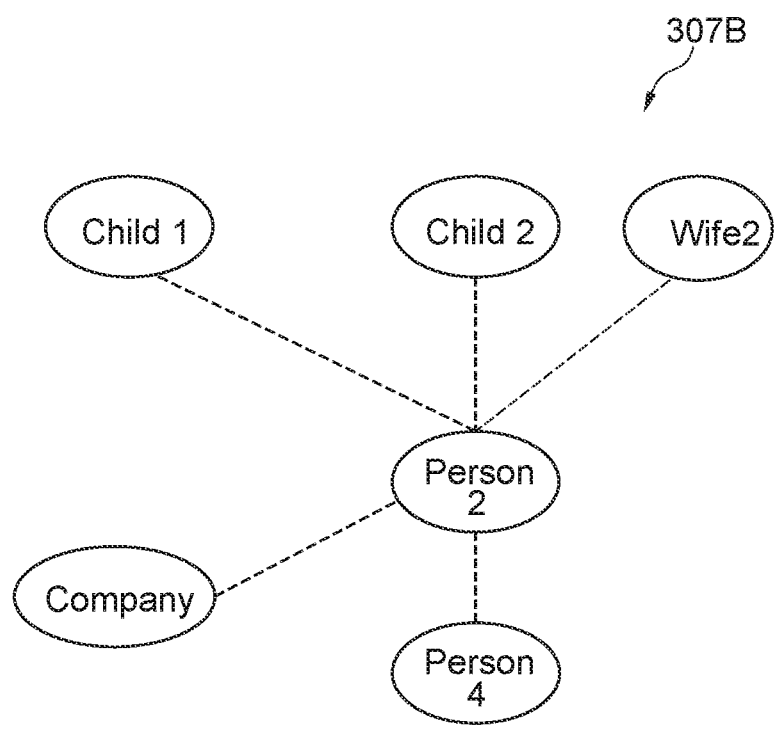

FIG. 3 shows two subgraphs 307A and 307B determined in accordance with the present subject matter for the two nodes representing person1 and person2 respectively of the graph 107 of FIG. 1B. The determined subgraph 307A of node person1 has edges with solid lines and has nodes representing wife1, child1, child2, company and person3, while the determined subgraph 307B of node person2 has edges with dashed lines and has nodes wife2, child1, child2, company and person4.

The two subgraphs may be determined using the following selection conditions: Degree out person to person=2 and Degree out person to company=1. The "degree out person to person" refers to a maximum distance of a path starting from a node representing a person and including an adjacent node representing a person. The "degree out person to company" refers to a maximum distance of a path starting from a node representing a person and including an adjacent node representing a company. This results for example in nodes person5 and person6 being not considered because the person to company's degree out is 1 i.e., the distance between the node of person2 and the node of person6 is two which is higher than the maximum distance (which is one) because the two first nodes of the path starting from node person2 represent different entities. The two subgraphs may further be determined using the filtering rule according to which only person and company nodes are included in the subgraphs.

FIG. 4 is a flowchart of a method for determining and using the first score $S_{GRP}$ in accordance with an example of the present subject matter. For the purpose of explanation, the method may be implemented in the computer system 100 illustrated in previous FIGS. 1A-B, but is not limited to this implementation. The method may for example be performed by the data integration system 101.

At least one pair of candidate nodes may be identified in step 401. For example, K pairs of candidate nodes may be identified in step 401, where K≥1. This may be referred to as second identification step. The K pairs of candidate nodes may be selected from the $J_2$ pairs of nodes described in FIG. 2, K≤$J_2$. In one example, all $J_2$ pairs of nodes may be identified in step 401 i.e., K=$J_2$. In another example, only pairs of nodes of the $J_2$ pairs which look roughly similar may be identified in step 401. Following the example of FIG. 3, the pair of nodes (wife1, wife2) may be the identified pair of step 401 (i.e., K=1) as it has higher probability to be a similar pair of nodes than the other pair of nodes (person3, person4). This is because the nodes of person1 and person2 share the same child nodes.

One node of each pair of the K pairs is in one neighborhood subgraph 307A and the other node of the pair is in the other neighborhood subgraph 307B. The candidate nodes are different from the target nodes. Following the example of FIG. 3, the mapping of the two subgraphs 307A and 307B may result in the following set of first pairs (person1, person2), (person3, person4) and (wife1 and wife2) and the set of second pairs of nodes (child1, child1), (child2, child2), (company, company). The K pairs of candidate nodes may be selected from the pairs of the first set of pairs (person3, person4) and (wife1, wife2). Following the notation of FIG. 2, this example indicates that $J_1$=3, the number of fully mapped pairs of nodes and $J_2$=2, the number of not fully mapped pairs of nodes excluding the target nodes (person1, person2).

The K pairs of candidate nodes may be compared in step 403. This may be referred to as third comparison step. This third comparison step may result in K third scores $S^j_{CNODE}$ (where j=1 . . . K) that is indicative of a similarity between the K pairs of candidate nodes respectively.

The first score $S_{GRP}$ may first be determined as described in FIG. 2 e.g., using the formula $S_{GRP}=J_1\times0+J_2\times1=J_2$. Furthermore, it may be reduced in step 405 using the K third scores $S^j_{CNODE}$. This may result in a reduced first score $S^{reduced}_{GRP}$. The reduction of the first score $S_{GRP}$ may be performed by first reducing the initial node scores of 1 that are associated to the K pairs of candidate nodes based on the values of respective third scores $S^j_{CNODE}$.

For example, if the third score $S^j_{CNODE}$ of one pair of nodes indicates that there is a match (e.g., 80% match) between nodes of said pair, the initial node score of 1 may significantly be reduced e.g., 1 may be reduced by 80%*1. If the third score $S^j_{CNODE}$ of one pair of nodes indicates that there is no match between nodes of said pair, the initial node score 1 may be maintained. If a clerical case is found, the initial score may be reduced to some extend e.g., by a user defined reduction value. The clerical case refers to clerical records. The clerical records are records for which a given matching process cannot determine if they are duplicate records to each other and hence should be merged or if one or multiple should be considered a non-match and hence should be kept separate from each other. Those clerical records may need a user intervention for a closer look into the values of the data records.

The reduced first score $S^{GRP}_{reduced}$ obtained with the present method may be combined in step 407 with the second score $S_{TNODE}$ for the determining whether the two target nodes (e.g., which may be identified as described in step 201) are duplicates with respect to each other based on the combined score. For example, the second score may be combined with the inverse of the reduce first score (e.g., $S_{TNODE}+1/S^{reduced}_{GRP}$) in order to obtain the combined score and if that combined score is higher than the threshold then the target nodes may be duplicate nodes.

FIG. 5 is a flowchart of a method for determining the first score in accordance with an example of the present subject matter. For the purpose of explanation, the method may be implemented in the computer system 100 illustrated in previous FIGS. 1A-B, but is not limited to this implementation. The method may for example be performed by the data integration system 101.

A mapping between the two neighborhood subgraphs may be performed in step 501.

First pairs of corresponding nodes which do not fully map with each other, may be identified in step 503. Following the example of subgraphs 307A and 307B, the mapping of the two subgraphs may result in the following first pairs of nodes (wife1, wife2), (person1, person2), (person3, person4)).

Second pairs of corresponding nodes which fully map with each other may be identified in step 505. Following the example of subgraphs 307A and 307B, the mapping of the two subgraphs may result in the following second pairs of nodes (child1, child1), (child2, child2), (company, company). The first score may, for example, be provided as $3/6$=0.5, indicating that 3 out of 6 pairs are identified not to be the same nodes. In another example, the first score may be determined using steps 507 to 511.

It may be assigned in step 507 to each pair of the first pairs an initial first node score indicating that the pair of nodes are completely different. For example, the initial first node score may be one. The number of first pairs excluding the pair of target nodes is $J_2$.

It may be assigned in step 509 to each pair of the second pairs an initial second node score indicating that there is no difference between the pair of nodes. For example, the initial second node score may be zero.

In one example, the initial first and second node scores may be combined for determining the first score indicative of the comparison result of the two subgraphs. In another example, the K third scores computed in FIG. 4 may be used to change the respective initial first node scores to update/change the difference level between the pairs of nodes (obtained using the mapping of step 501) based on the third score. If, for example, the initial first node score is defined as above, e.g., equal to 1 for completely different nodes, the third scores may be used to reduce the respective initial first node scores (e.g., as described in FIG. 4) in step 511. Indeed, the K third scores are indicative of the similarity level (e.g., a value between 0% and 100%) between the respective pairs of nodes of the $J_2$ first pairs of nodes. The initial first node score assigned to each pair of nodes of the K pair of nodes may, for example, be reduced by the third score as follows $1-S^j_{CNODE} \times 1$. The second initial node scores, non-reduced initial first node scores and reduced initial first node scores may be combined in step 513 for determining the first score.

Figure 6:
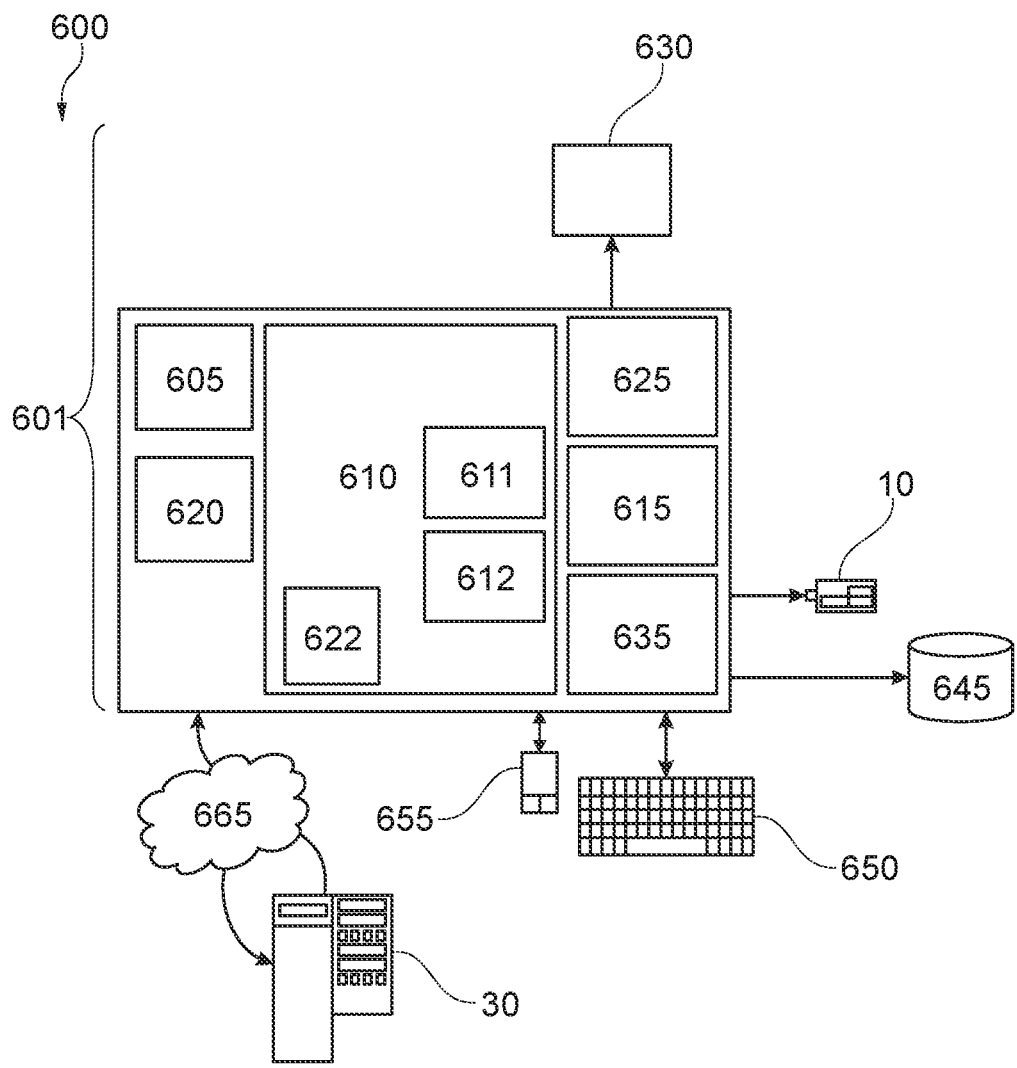
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware for BIOS 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices 645 (or peripherals) that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program (e.g., object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
duplicating determination in a graph that comprises nodes representing entities and edges representing relationships between the entities, wherein duplicating determination in the graph comprises:
identifying at least two target nodes in the graph;
determining a neighborhood subgraph for each of the two target nodes, the neighborhood subgraph including a respective target node; and
determining whether the two target nodes are duplicates with respect to each other based on comparisons between two neighborhood subgraphs of the two target nodes, comparisons between two subgraphs, and comparisons between candidate nodes, wherein determining whether the two target nodes are duplicates comprise:
generating a first score indicative of a difference between two neighborhood subgraphs by comparing the two neighborhood subgraphs of the two target nodes;
generating a second score indicative of a similarity between the two target nodes using probabilistic matching;
generating a third score indicative of a similarity between at least one pair of candidate nodes; and
determining whether the two target nodes are duplicates based on a combination of the first score and the second score and the third score.

2. The computer implemented method of claim 1, further comprising:
identifying at least one pair of candidate nodes, such that one node of each pair of the candidate nodes is in one neighborhood subgraph and another node of the pair is in another neighborhood subgraph, the at least one pair of candidate nodes being different from the target nodes;
reducing the first score based on the at least third score; and
combining the reduced first score and the second score to determine whether the two target nodes are duplicates with respect to each other.

3. The computer implemented method of claim 2, wherein comparing of the two neighborhood subgraphs comprises:
performing a mapping between the two neighborhood subgraphs;
identifying a first pair of corresponding nodes which do not fully map with each other, wherein the at least one identified pair of candidate nodes is selected from the first pair;
identifying a second pair of corresponding nodes which fully map with each other;
assigning to each pair of the at least identified pair of candidate nodes associated with the first pair a first initial node score indicating that respective pairs of nodes are completely different; and
assigning to each pair of the at least identified pair of candidate nodes associated with the second pair a second initial node score indicating that there is no difference between the respective pairs of nodes.

4. The computer-implemented method of claim 2, wherein the reducing of the first score based on the at least third score comprises:
changing a first initial node score assigned to each pair of at least one identified pair of candidate nodes to indicate a reduced difference level between the pair of nodes based on the respective third score; and
combining a second initial node score, a non-changed first initial node score, and the changed first initial node score.

5. The computer implemented method of claim 2, wherein comparing the at least one pair of candidate nodes are performed using a probabilistic matching method.

6. The computer implemented method of claim 2, wherein a node of each pair of the candidate nodes corresponds to an entity having a set of entity attributes, and
wherein comparing the at least one pair of candidate nodes comprises:
comparing values of the set of entity attributes of two compared nodes,
determining for each attribute of the set of entity attributes an attribute score indicative of a comparison result of values associated with a respective attribute, and
combining the attribute scores for determining the second score or the third score.

7. The computer implemented method of claim 1, wherein comparing two neighborhood subgraphs of the two target nodes comprises:
performing a mapping between two neighborhood subgraphs;
identifying a first pair of corresponding nodes which do not fully map with each other;
identifying a second pair of corresponding nodes which fully map with each other;
assigning to each pair of the first pair, a first initial node score indicating that the first pair of nodes are completely different;
assigning to each pair of the second pair, a second initial node score indicating that there is no difference between the second pair of nodes; and
combining the first and the second initial node scores to determine a first score indicative of the comparison result of the two subgraphs.

8. The computer implemented method of claim 1, wherein comparing the two target nodes comprises:
determining a probability whether the two target nodes are duplicate with respect to each other; and
in response to determining that the probability is higher than a threshold,
determining a neighborhood subgraph for each of the two target nodes, the neighborhood subgraph including the respective target node,
comparing two neighborhood subgraphs of the two target nodes, and
determining whether the two target nodes are duplicates with respect to each other, based on the comparison of the two neighborhood subgraphs and on the comparison of the target nodes.

9. The computer implemented method of claim 1, wherein determining a neighborhood subgraph for each of the two target nodes comprises:
selecting nodes of the graph using a selection criterion, wherein the selection criterion is based on at least one of: a number of nodes, an entity represented by a node, a distance between the node and another node in the subgraph; and the subgraph comprising the selected nodes.

10. The computer implemented method of claim 9, wherein the selection criterion requires at least one of:
the number of nodes of the subgraph being smaller than a maximum number;
an edge of the subgraph connected to at least one node that represents a same entity as the entity of the node; and the distance between the node and another node in the subgraph is smaller than a threshold number of edges.

11. The computer implemented method of claim 1, wherein determining whether the two target nodes are duplicates with respect to each other, based on the comparison of the two neighborhood subgraphs and on the comparison of the target nodes comprises:
removing duplicate nodes of each subgraph of the neighborhood subgraphs.

12. The computer implemented method of claim 1, further comprising:
using a received indication of the two identified nodes for identifying at least two target nodes in the graph.

13. A computer program product comprising:
one or more computer readable storage media and program instructions stored on the one or more computer readable storage media, the program instructions comprising:
program instructions to duplicate determination in a graph that comprises nodes representing entities and edges representing relationships between the entities, wherein the program instructions to duplicate determination in the graph comprises:
program instructions to identify at least two target nodes in the graph;
program instructions to determine a neighborhood subgraph for each of the two target nodes, the neighborhood subgraph including a respective target node; and
program instructions to determine whether the two target nodes are duplicates with respect to each other based on comparisons between two neighborhood subgraphs of the two target nodes, comparisons between two subgraphs, and comparisons between candidate nodes, wherein determining whether the two target nodes are duplicates comprise:
program instructions to generate a first score indicative of a difference between two neighborhood subgraphs by comparing the two neighborhood subgraphs of the two target nodes;
program instructions to generate a second score indicative of a similarity between the two target nodes using probabilistic matching;
program instructions to generate a third score indicative of a similarity between at least one pair of candidate nodes; and
program instructions to determine whether the two target nodes are duplicates based on a combination of the first score and the second score and the third score.

14. The computer program product of claim 13, wherein the program instructions stored on the one or more computer readable storage media further comprise:
program instructions to identify at least one pair of candidate nodes, such that one node of each pair of the candidate nodes is in one neighborhood subgraph and another node of the pair is in another neighborhood subgraph, the at least one pair of candidate nodes being different from the target nodes;
program instructions to compare the identified at least one pair of candidate nodes, wherein comparing the at least one pair of candidate nodes results in at least a third score that is indicative of a similarity between the at least one pair of candidate nodes respectively;
program instructions to reduce the first score based on the at least third score; and
program instructions to combine the reduced first score and the second score to determine whether the two target nodes are duplicates with respect to each other.

15. The computer program product of claim 14, wherein the program instructions to compare of the two neighborhood subgraphs comprise:
program instructions to perform a mapping between the two neighborhood subgraphs;
program instructions to identify a first pair of corresponding nodes which do not fully map with each other, wherein the at least one identified pair of candidate nodes is selected from the first pair;
program instructions to identify a second pair of corresponding nodes which fully map with each other;
program instructions to assign to each pair of the at least identified pair of candidate nodes associated with the first pair a first initial node score indicating that respective pairs of nodes are completely different; and
program instructions to assign to each pair of the at least identified pair of candidate nodes associated with the second pair a second initial node score indicating that there is no difference between the respective pairs of nodes.

16. A computer system comprising:
one or more computer processors;
one or more computer readable storage media; and
program instructions stored on the one or more computer readable storage media for execution by at least one of the one or more computer processors, the program instructions comprising:
program instructions to duplicate determination in a graph that comprises nodes representing entities and edges representing relationships between the entities, wherein the program instructions to duplicate determination in the graph comprises:
program instructions to identify at least two target nodes in the graph;
program instructions to determine a neighborhood subgraph for each of the two target nodes, the neighborhood subgraph including a respective target node; and
program instructions to determine whether the two target nodes are duplicates with respect to each other based on comparisons between two neighborhood subgraphs of the two target nodes, comparisons between two subgraphs, and comparisons between candidate nodes, wherein determining whether the two target nodes are duplicates comprise:
program instructions to generate a first score indicative of a difference between two neighborhood subgraphs by comparing the two neighborhood subgraphs of the two target nodes;
program instructions to generate a second score indicative of a similarity between the two target nodes using probabilistic matching;
program instructions to generate a third score indicative of a similarity between at least one pair of candidate nodes; and
program instructions to determine whether the two target nodes are duplicates based on a combination of the first score and the second score and the third score.

17. The computer system of claim 16, wherein the program instructions stored on the one or more computer readable storage media further comprise:
program instructions to identify at least one pair of candidate nodes, such that one node of each pair of the candidate nodes is in one neighborhood subgraph and another node of the pair is in another neighborhood subgraph, the at least one pair of candidate nodes being different from the target nodes;

program instructions to compare the identified at least one pair of candidate nodes, wherein comparing the at least one pair of candidate nodes results in at least a third score that is indicative of a similarity between the at least one pair of candidate nodes respectively;

program instructions to reduce the first score based on the at least third score; and program instructions to combine the reduced first score and the second score to determine whether the two target nodes are duplicates with respect to each other.

* * * * *